Dec. 8, 1925.　　　　J. L. KIMBALL　　　　1,564,683
PRESSURE REGULATOR
Filed April 6, 1923
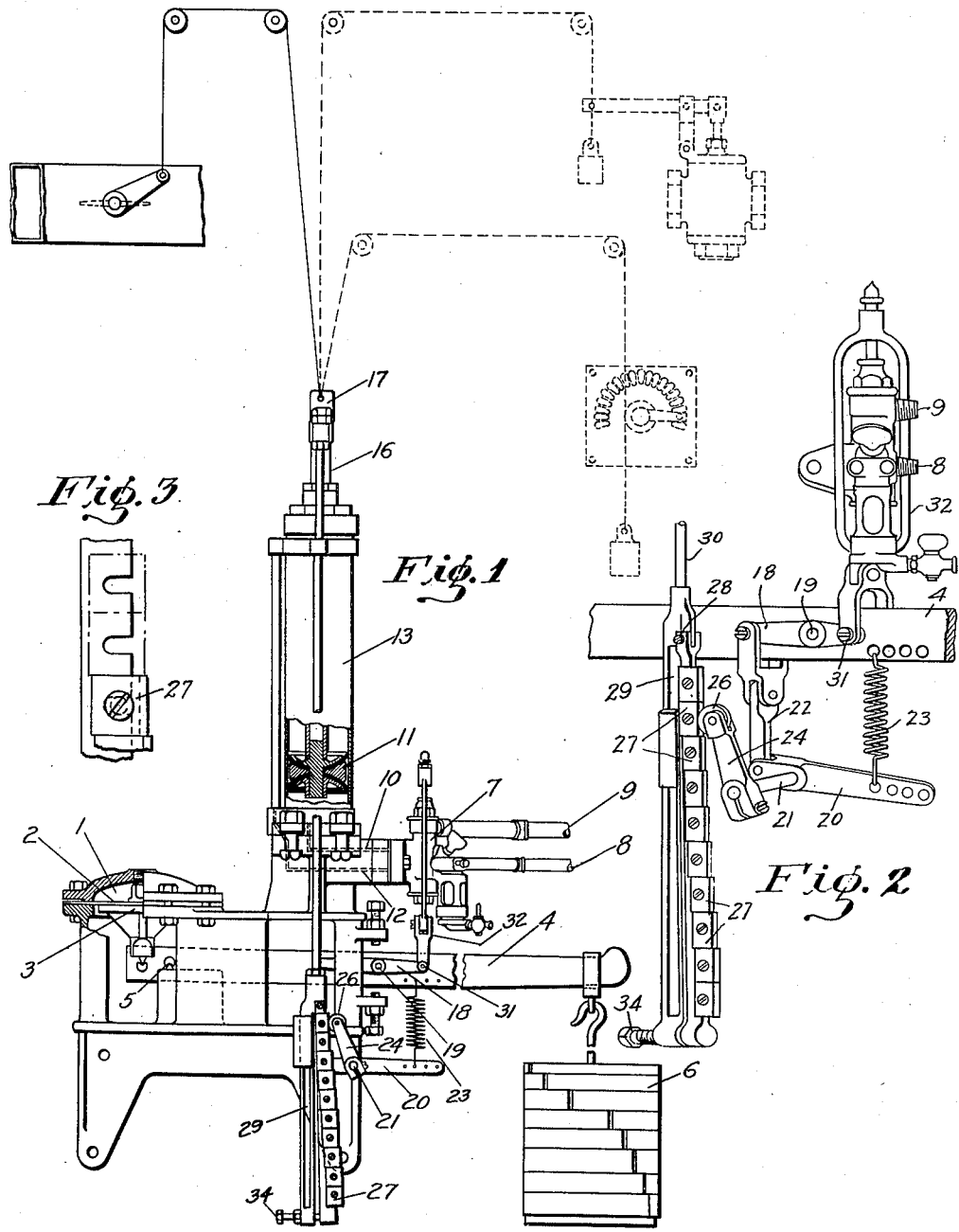
Inventor-
James L. Kimball Patented Dec. 8, 1925.

1,564,683

UNITED STATES PATENT OFFICE.

JAMES L. KIMBALL, OF SALEM, MASSACHUSETTS, ASSIGNOR TO RUGGLES-KLINGEMANN MFG. CO., OF SALEM, MASSACHUSETTS, A CORPORATION OF MASSACHUSETTS.

PRESSURE REGULATOR.

Application filed April 6, 1923. Serial No. 630,289.

*To all whom it may concern:*

Be it known that I, JAMES L. KIMBALL, a citizen of the United States, residing at 9 Dearborn St., Salem, in the county of Essex and State of Massachusetts, have invented certain new and useful Improvements in Pressure Regulators, of which the following is a specification.

My present invention relates to pressure regulators of the type shown in my application Serial No. 574,975 of July 14, 1922. The object of this invention is to provide variable, graduated step action for governing the operation of dampers, valves and rheostats, or other pressure-controlling devices. While it is desirable to have step action instead of floating action in the control of such pressure-regulating devices, it is not desirable to arrange such steps uniformly, but to provide for a variable control to meet any variable factors governing the operation of such devices.

Centrifugal pumps have a variable pumping characteristic, in that no water is pumped until a certain speed is reached. In regulating such pumps it is not desirable to provide cutoff or stopping points until the speed of the pump has reached its pumping characteristic, and for this reason the regulator should be arranged with non-compensating periods between cut-off points while the speed of the pump is being brought up to its pumping characteristic. It will be seen that, in case the regulator should cut off or compensate during the speed-building-up stage, the motor which controlled the pump would be unnecessarily operated at a speed which would not be effective in pumping water. After the pump has reached its pumping characteristic, then it should be operated by steps; but such steps should not be uniformly spaced for the reason that the pumping will not be uniform. Or, in other words, the object to be attained is a uniform volume of water to be pumped for a uniform variation in the discharge pressure of the pump, and not uniform action of the pump-controlling means.

When such regulators are used for the control of dampers in connection with steam boilers, it will be understood that it is desirable to regulate the drafts in uniform increments consistent with uniform increments of steam-pressure variation, instead of uniform increments of damper movement, and to control the damper in such a way as to give the smallest amount of movement at that point of the cycle where the disturbance in the furnace conditions would be the greatest; that is to say, the final closing movement of the damper; and to give a greater travel on its first closing movement, where the disturbance in the furnace conditions is negligible.

These variable characteristics are not only found in damper and pump control, but in forced and induced-draft fans. They also have variable blowing characteristics, which it is desirable to compensate for by variable step action.

In the drawings, Figure 1 shows a vertical elevation of my invention, certain parts being in section; Figure 2 shows the variable compensating steps separate from the regulator; Figure 3 shows means for adjusting the steps so as to effect variable cut-off action; and Figure 4 shows one of the steps apart from the compensating attachment.

Referring to Figure 1, (1) is a pressure chamber which is closed by a flexible diaphragm (2). A pressure cap (3) is mounted on the atmospheric side of the diaphragm and engages a valve-operating member (4), the valve-operating member being fulcrumed at (5). Weights (6) are placed on the valve-operating member to counteract the predetermined pressure to be maintained in the chamber (1). The above elements constitute a preferred embodiment of a pressure device for operating a pressure controlling valve (7). These parts are in general of the construction shown in my prior application Serial 574,975. The pressure controlling valve (7) may be of any suitable construction, but preferably of the embodiment shown in the application referred to. The inlet for fluid under pressure is shown at (8) and the exhaust at (9). A port (10) leads to the bottom of the motor piston (11) and a port (12) leads to the top of motor cylinder (13), above the piston (11). Piston (11) has a piston rod (16) extending through the top of the cap of the motor (13). A connecting member (17) is secured to the top of the piston rod (16) and provides means for operating a damper, a valve, a rheostat, or other pressure-controlling device. A member (18) is pivoted to valve-operating member (4) at a point (19) and is arranged to be rocked by a member (20), which has a stationary pivoted bearing about the axis of a shaft, a connection (22) being made between the left-hand ends of the members (18) and (20). The opposite end of the member (20) is connected to the valve operating member (4) by means of a spiral spring (23). An arm (24) is secured to the shaft (21) and has a roll (26) at its upper end. The roll (26) is held in engagement with the adjustable step member (27) by the spring (23). The adjustable step member is hinged at (28) to the member (29). The member (29) has a rod (30) which connects with the piston-rod top (17). It will be seen that members (27) and (29) are connected to, and travel up and down, with the piston (11).

It will be understood that any variation of pressure in the pressure chamber (1) above or below a predetermined value will impart motion to the valve operating member (4), and as the member (18) is pivoted to the member (4) at the point (19), and at the right hand end of this member is connected at (31) to a valve yoke (32), its left hand end being held stationary, such variations in pressure will operate the valve (7) to a pressure position which will admit fluid pressure to the motor cylinder (13). Assuming an increase in pressure in the chamber (1), the controlling valve would admit pressure to the under side of piston (11) through the port (10), and at the same time vent the upper side of the piston (11) to the exhaust connection; while a decrease in pressure will admit fluid under pressure to the top of the motor cylinder and vent the bottom to exhaust.

The object of my invention being to effect variable step cut-off action at predetermined points in the travel of the piston (11), I have arranged novel adjustable steps (27), which may be so adjusted as to rock the members (18) and (20) at predetermined points, to effect a movement of the controlling valve independent of the pressure device. The movement imparted to the controlling valve from movement of the piston (11) is always in the direction to return the valve to a non-effective position, as the roll (26) engages the higher or lower block of the compensating attachment.

Assuming an increase in pressure in the chamber (1), the controlling valve is opened to pressure below the piston (11), which results in an upward movement of the piston (11), placing the roll (26) on a higher stepped position on the block (27). The members (18) and (20) are thus rocked to return the valve (7) to a non-effective position. In the same way, on a decrease in pressure in the chamber (1), pressure is admitted above the piston (11), which results in a downward movement of the piston (11) and a placing of the roll (26) on a lower stepped position on one of the blocks (27). This results in rocking the members (18) and (20) to effect the operating of the controlling valve to a neutral or non-effective position, and again stopping the movement of the piston (11). I have arranged to effect a greater or less pressure variation between the limits of travel of the piston (11) by means of an adjusting screw (34).

It will be seen that if all the blocks (27) were parallel to the member (29), the position of the controlling valve (7) would not be changed during the entire travel of the piston (11). No cut-off action could therefore take place, the controlling valve (7) could not be moved back to a cut-off position, and the motor piston (11) would continue to travel from one extreme to the other with very little variation of pressure in the chamber (1). It will be seen that the compensating or cut-off blocks (27) can be adjusted so as to provide cut-off points at predetermined positions in the travel of the piston (11), and that two or more of these blocks may be arranged parallel to the member (29), so as not to effect cut-off action. After the block (27) has been arranged by adjustment to effect cut-off action at the desired point in the travel of the motor piston (11), the angularity of these blocks as a whole may be adjusted, by means of the adjusting screw (34), in relation to the member (29), so as to effect a greater or less pressure variation between the minimum and maximum limits of travel of the piston (11).

It has been pointed out that the spring (23) holds the roll (26) in engagement with the stepped blocks (27). The principal object, however, is to vary the pressure setting of the pressure device at each cut-off position in the travel of the motor piston (11). It will be seen that the position of the spring (23) can be shifted so as to effect a greater or less variation in the pressure setting of the pressure device in each cut-off position.

It will be seen by those skilled in the art that I have devised novel and useful means for compensating the action of a fluid-pressure motor to effect a step-by-step movement, and have devised novel means whereby each cut-off position can be varied to effect variable action in compensating for any variable factors in the pressure-controlling means. In accordance with the provisions of the patent statutes, I have described the principle of operation of my invention, together with the apparatus which I now consider to represent the best embodiment thereof, but I desire to have it understood that the apparatus shown is only illustrative and is capable of various modifications, and that only such limitations shall be imposed as are indicated in the appended claims.

What is claimed is:—

1. The combination with a fluid pressure motor and a pressure device, of means controlled by the pressure device for effecting the operation of the fluid-pressure motor, means controlled by the operation of the fluid-pressure motor, adapted to render the fluid-pressure motor ineffective at each of a plurality of positions in the operation of the fluid-pressure motor and means for adjusting the said positions.

2. The combination with a fluid pressure motor and a pressure device, of means controlled by the pressure device for effecting the operation of the fluid-pressure motor, means controlled by the operation of the fluid-pressure motor adapted to render the fluid-pressure motor ineffective at each of a plurality of positions in the operation of the fluid pressure motor, and means for adjusting the second-named means to adjust the definite positions at which the fluid-pressure motor is rendered inoperative.

3. The combination with a fluid-pressure motor and a pressure device, of means controlled by the pressure device for effecting the operation of the fluid-pressure motor, means controlled by the operation of the fluid-pressure motor adapted to render the fluid-pressure motor ineffective at each of a plurality of positions in the operation of the fluid-pressure motor, means for adjusting the said positions, and means to change the pressure setting of the pressure device at each of said ineffective positions.

4. The combination with a fluid-pressure motor and a pressure device, of means controlled by the pressure device for effecting the operation of the fluid-pressure motor, a stepped cut-off attachment operated by said motor, and means to individually adjust said steps and to collectively adjust said steps to render the fluid-pressure motor ineffective at each of a plurality of varying positions in the operation of the fluid-pressure motor.

5. The combination with fluid-pressure motor and a pressure responsive device, of means controlled in response to the pressure device for effecting the operation of the fluid-pressure motor, and a variable stepped member controlled by the operation of the fluid-pressure motor adapted to render the fluid-pressure motor ineffective at each of a plurality of positions in the operation of the fluid-pressure motor.

6. The combination with a fluid-pressure motor and a pressure-responsive device, of means controlled in response to the pressure device for effecting the operation of the fluid pressure motor, a stepped cut-off attachment operated by said motor having adjustable steps adapted to render the fluid pressure motor ineffective at varying positions in its operation and means to adjust said steps collectively to effect a greater or less change in the pressure setting of the pressure responsive device at each cut-off position in the operation of the fluid-pressure motor.

7. In a pressure system, means for controlling the pressure in the system, means controlled in accordance with the said pressure for controlling the pressure-controlling means, compensating means for counteracting step by step the action of the second-named means with abruptly increasing and decreasing counter action at the said steps, whereby the controlling means becomes checked at the said steps, and means for adjusting the steps.

8. In combination, a motor, an element having a neutral position in which it is ineffective to control the motor and an effective position in which it controls the operation of the motor, a pressure device for controlling the element, means operable at definite steps in the operation of the motor for abruptly actuating the element to the neutral position, means for changing the pressure setting of the pressure device during the actuation of the element to the neutral position, and means for adjusting the steps.

9. In combination, a motor, means for controlling the motor, a compensating stepped cam for counteracting step by step the action of the controlling means with abruptly increasing and decreasing counter action at the said steps, whereby the further operation of the motor becomes checked at the said steps, and means for adjusting the steps of the cam.

10. In combination, a pressure device, a compensating wedge for counteracting the action of the pressure device, means for adjusting portions of the wedge, and means for adjusting the wedge as a whole.

11. In combination, controlling means, means controlled in accordance with the operation of the controlling means for controlling the controlling means, compensating means for counteracting step by step the action of the second-named means with abruptly increasing and decreasing counteraction at the said steps, whereby the further operation of the first-named controlling means becomes checked at the said steps, and means for varying the action of the counteracting means at one or more of the said steps without affecting the action of the counteracting means at the other steps.

12. In a pressure system, means for controlling the pressure in the system, means controlled in accordance with the said pressure for controlling the pressure-controlling means, a compensating cam having a plurality of steps counteracting step by step, at the said steps, the action of the second-named means, whereby the operation of the pressure-controlling means becomes checked at the said steps, and means for adjusting one or more of the steps without affecting the other steps.

13. In combination, a motor, means for controlling the motor, a pressure device for controlling the controlling means, means operable at definite steps in the operation of the motor for controlling the motor-controlling means and the pressure setting of the pressure device, and means for adjusting the steps.

14. In combination, a fluid-pressure motor, a valve having a neutral position in which it is ineffective to control the motor and an effective position in which it controls the operation of the motor, a pressure device for controlling the valve, means operable at definite steps in the operation of the motor to return the valve to the neutral position and to change the pressure setting of the pressure device, and means for adjusting the steps.

15. In combination, a motor, an element having a neutral position in which it is ineffective to control the motor and an effective position in which it controls the operation of the motor, a pressure device for controlling the element, a member operable at definite steps in the operation of the motor, means connecting the member to the element to actuate the element to the neutral position, means connecting the member to the pressure device to change the pressure setting of the pressure device, and means for adjusting the steps.

16. In a pressure system, means for controlling the pressure in the system, motive means for operating the controlling means, a controlling element for operating the motive means, a pressure-responsive device for actuating the controlling element, a cut-off member having multiple steps operated from the motive means for rendering the controlling element ineffective independently of the pressure-responsive device at each stepped position, adjustable means for varying the ineffective positions in the operation of the motive means, and means to vary the ineffective pressure range at each ineffective position.

17. In a pressure system, a damper for controlling the pressure in the system, a fluid-pressure motor for operating the damper, a pilot valve for operating the fluid-pressure motor, a diaphragm for actuating the pilot valve, a cut-off wedge having multiple steps operated from the fluid-pressure motor for rendering the pilot valve ineffective independently of the diaphragm, means to adjust said steps in one direction in relation to one another for varying the ineffective position in the operation of the fluid pressure motor, and means for adjusting said steps in another direction to vary the ineffective pressure range at each ineffective position.

JAMES L. KIMBALL.